(12) United States Patent
Bay et al.

(10) Patent No.: US 11,515,564 B2
(45) Date of Patent: Nov. 29, 2022

(54) SURFACE TREATMENT OF A SOLID ELECTROLYTE TO LOWER THE INTERFACIAL RESISTANCE BETWEEN THE SOLID ELECTROLYTE AND AN ELECTRODE

(71) Applicants: The Regents of the University of Michigan, Ann Arbor, MI (US); EMPA, Dubendorf (CH)

(72) Inventors: Marie-Claude Bay, Zurich (CH); Corsin Battaglia, Lindau (CH); Michael Wang, Ann Arbor, MI (US); Jeff Sakamoto, Ann Arbor, MI (US)

(73) Assignees: THE REGENTS OF THE UNIVERSITY OF MICHIGAN, Ann Arbor, MI (US); EMPA, Dubendorf (CH)

( * ) Notice: Subject to any disclaimer, the term of this patent is extended or adjusted under 35 U.S.C. 154(b) by 236 days.

(21) Appl. No.: 16/560,229

(22) Filed: Sep. 4, 2019

(65) Prior Publication Data
US 2021/0066747 A1    Mar. 4, 2021

(51) Int. Cl.
*H01M 10/054* (2010.01)
*H01M 10/0562* (2010.01)

(52) U.S. Cl.
CPC ..... *H01M 10/0562* (2013.01); *H01M 10/054* (2013.01); *H01M 2300/0071* (2013.01)

(58) Field of Classification Search
CPC .......... H01M 10/0562; H01M 10/054; H01M 2300/0071; Y02P 70/50; Y02E 60/10
See application file for complete search history.

(56) References Cited

U.S. PATENT DOCUMENTS

| 4,381,968 A | * | 5/1983 | Singh | ............... C09K 13/04 216/101 |
| 6,537,940 B1 | | 3/2003 | Virkar et al. | |

(Continued)

FOREIGN PATENT DOCUMENTS

| EP | 0675558 | * | 11/1998 | ............ H01M 10/39 |
| EP | 1213781 A2 | * | 6/2002 | ........... C04B 35/113 |

(Continued)

OTHER PUBLICATIONS

Kasemchainan et al. "Critical stripping current leads to dendrite formation on plating in lithium anode solid electrolyte cells." Nature Materials, 18, 1105-1111 (2019), available online Jul. 2019 (Year: 2019).*

(Continued)

*Primary Examiner* — Michael L Dignan
(74) *Attorney, Agent, or Firm* — Quarles & Brady LLP

(57) ABSTRACT

Disclosed are electrochemical devices, such as sodium ion conducting solid state electrolytes, sodium battery electrodes, and solid-state sodium metal batteries including these electrodes and solid state electrolytes. One example method for preparing a sodium/sodium-β"-alumina interface with low interfacial resistance and capable of achieving high current density in an electrochemical cell includes the steps of: (a) providing a precursor electrolyte having a resistive surface region, wherein the precursor electrolyte comprises sodium-β"-alumina; (b) removing at least a portion of the resistive surface region; (c) heating the precursor electrolyte thereby forming a solid state electrolyte, and (d) placing a side of the solid state electrolyte in contact with a sodium anode.

19 Claims, 7 Drawing Sheets
(6 of 7 Drawing Sheet(s) Filed in Color)

(56) References Cited

U.S. PATENT DOCUMENTS

| | | |
|---|---|---|
| 9,755,270 B2 | 9/2017 | Kim et al. |
| 10,276,892 B2 | 4/2019 | Wachsman et al. |
| 10,355,305 B2 | 7/2019 | Bhavaraju |
| 2017/0092981 A1* | 3/2017 | Anandan ............ H01M 10/0585 |
| 2017/0250406 A1 | 8/2017 | Armand et al. |
| 2019/0173082 A1 | 6/2019 | Zhamu et al. |
| 2020/0112055 A1* | 4/2020 | Yamauchi ......... H01M 10/0562 |
| 2020/0194826 A1* | 6/2020 | Ikejiri ................. H01M 50/489 |

FOREIGN PATENT DOCUMENTS

| | | |
|---|---|---|
| WO | 2018184007 A1 | 10/2018 |
| WO | 2019070568 A2 | 4/2019 |

OTHER PUBLICATIONS

Albertus et al., Status and Challenges in Enabling the Lithium Metal Electrode for High-Energy and Low-Cost Rechargeable Batteries, Nature Energy, 2018, 3(1):16-21.

Bay et al., Impact of Liquid Phase Formation on Microstructure and Conductivity of Li-stabilized Na-β'-alumina Ceramics, ACS Applied Energy Materials, 2019, 2(1):687-693.

Cheng et al., Intergranular Li Metal Propagation Through Polycrystalline Li6.25Al0.25La3Zr2O12 Ceramic Electrolyte, Electrochimica Acta, 2017, 223:85-91.

De Jonghe et al., Failure Modes of Na-beta Alumina, Solid State Ionics, 1981, 5:267-270.

Dustmann, Advances in ZEBRA Batteries, Journal of Power Sources, 2004, 127(1-2):85-92.

Fritz et al., Electronic Conductivity of Na β'-Alumina Ceramics at High Temperatures, Solid State Ionics, 1993, 62(3-4):273-277.

Gong et al., Recent Advances in the Research of Polyanion-Type Cathode Materials for Li-ion Batteries, Energy & Environmental Science, 2011, 4:3223-3242.

Guduru et al., A Brief Review on Multivalent Intercalation Batteries with Aqueous Electrolytes, Nanomaterials, 2016, 6:41, 19 pages.

Gupta et al., Evaluating the Effects of Temperature and Pressure on Li/PEO-LiTFSI Interfacial Stability and Kinetics, Journal of the Electrochemical Society, 2018, 165(11):A2801-A2806.

Han et al., High Electronic Conductivity as the Origin of Lithium Dendrite formation within Solid Electrolytes, Nature Energy, 2019, 4(3):187-196.

Hitz et al., High-Rate Lithium Cycling in a Scalable Trilayer Li-Garnet-Electrolyte Architecture, Materials Today, 2019, 22:50-57.

Krauskopf et al., Toward a Fundamental Understanding of the Lithium Metal Anode in Solid-State Batteries—An Electrochemo-Mechanical Study on the Garnet-Type Solid Electrolyte Li6.25Al0.25La3Zr2O12, ACS Applied Materials & Interfaces, 2019, 11(15):14463-14477.

Lin et al., Reviving the Lithium Metal Anode for High-Energy Batteries, Nature Nanotechnology, 2017, 12(3):194-206.

Luo et al., Reducing Interfacial Resistance Between Garnet-Structured Solid-State Electrolyte and Li-metal Anode by a Germanium Layer, Advanced Materials, 2017, 29(22):1606042, 7 pages.

Murugan et al., Fast Lithium Ion Conduction in Garnet-Type Li7La3Zr2O12, Angewandte Chemie International Edition, 2007, 46(41):7778-7781.

Porz et al., Mechanism of Lithium Metal Penetration Through Inorganic Solid Electrolytes, Advanced Energy Materials, 2017, 7(20):1701003, 12 pages.

Ren et al., Direct Observation of Lithium Dendrites Inside Garnet-Type Lithium-Ion Solid Electrolyte, Electrochemistry Communications, 2015, 57:27-30.

Sharafi et al., Characterizing the Li-Li7La3Zr2O12 Interface Stability and Kinetics as a Function of Temperature and Current Density, Journal of Power Sources, 2016, 302:135-139.

Sharafi et al., Surface Chemistry Mechanism of Ultra-Low Interfacial Resistance in the Solid-State Electrolyte Li7La3Zr2O12, Chemistry of Materials, 2017, 29(18):7961-7968.

Sudworth, The Sodium/Sulphur Battery, Journal of Power Sources, 1984, 11(1-2):143-154.

Sudworth, The Sodium/Nickel Chloride (ZEBRA) Battery, Journal of Power Sources, 2001, 100(1-2):149-163.

Thangadurai et al., Garnet-Type Solid-State Fast Li Ion Conductors for Li Batteries: Critical Review, Chemical Society Reviews, 2014, 43(13):4714-4727.

Tsai et al., Li7La3Zr2O12 Interface Modification for Li Dendrite Prevention, ACS Applied Materials & Interfaces, 2016, 8(16):40617-10626.

Viswanathan et al., Wetting Characteristics of Sodium on α'-alumina and on Nasicon, Journal of Materials Science, 1982, 17(3):753-759.

Wang et al., Characterizing the Li-Solid-Electrolyte Interface Dynamics as a Function of Stack Pressure and Current Density, Joule, 2019, 3(9):2165-2178.

Wang et al., Temperature Dependent Flux Balance of the Li/Li7La3Zr2O12 Interface, Electrochimica Acta, 2019, 296:842-847.

Wenzel et al., Interfacial Reactivity Benchmarking of the Sodium Ion Conductors Na3PS4 and Sodium β-alumina for Protected Sodium Metal Anodes and Sodium All-Solid-State Batteries, ACS Applied Materials & Interfaces, 2016, 8(41):28216-28224.

\* cited by examiner

SURFACE TREATMENT OF A SOLID ELECTROLYTE TO LOWER THE INTERFACIAL RESISTANCE BETWEEN THE SOLID ELECTROLYTE AND AN ELECTRODE

CROSS-REFERENCES TO RELATED APPLICATIONS

Not applicable.

STATEMENT REGARDING FEDERALLY SPONSORED RESEARCH

Not applicable.

FIELD OF THE INVENTION

This invention relates to electrochemical devices, such as sodium ion conducting solid state electrolytes, sodium battery electrodes, and solid-state sodium batteries including these electrodes and solid state electrolytes.

BACKGROUND

Na-β"-alumina (NBA) ceramics are fast sodium-ion conductors and are commercially applied as electrolytes in high-temperature sodium-nickel-chloride (NaNiCl) and sodium-sulfur (NaS) batteries.

Currently, electrical vehicles are operated using lithium-ion battery technologies. They are, however, not yet competitive to traditional fuel vehicles and suffer from safety concerns related to the use of flammable liquid electrolyte. Ceramic solid-state electrolytes may thus provide a safe alternative to conventional liquid electrolytes as they are nonflammable. In parallel, the usage of a metallic anode could allow significant increase in energy density.

One challenge in the development of sodium solid-state batteries is associated with the high interfacial resistance between the ceramic NBA electrolyte and metallic sodium anode. This high interfacial resistance was shown to significantly reduce the critical current densities that the cell can sustain before short circuiting of the cell by the formation of a metallic filament through the electrolyte, referred to as a dendrite. While the cause for high interfacial resistance is not yet established, it is believed that poor wetting of sodium and the presence of impurities at the surface of NBA formed by the exposure to moisture and air play a role. Different strategies have been developed, such as coating the NBA surface with lead, carbon or tin, or heat treating the NBA at 400° C. before cell assembly. While these results have been shown to successfully improve sodium wetting, recent reports still present large interfacial resistances of several hundred ohms at room temperature.

Reducing the interfacial resistance is also currently intensively studied for Li-ion conducting ceramics, particularly lithium lanthanum zirconium oxide (LLZO) ceramics. It was shown that heat treatment of the LLZO ceramics was successful in reducing the interfacial resistance by removing surface impurities. Despite low interfacial resistances, the critical current density (CCD) values at room temperature (1 mA/cm$^2$) are still below the minimum values required for fast-charge applications such as electrical vehicles (>3 mA/cm$^2$). The critical current density refers to the current density a solid electrolyte can support before failure is observed.

What is needed therefore are methods for lowering the interfacial resistance between an electrode and a solid state electrolyte and for raising the critical current density for solid-state batteries.

SUMMARY OF THE INVENTION

The present disclosure provides methods for forming and treating an electrochemical device to lower the area specific-resistance (ASR) of the interfacial resistance between a solid state electrolyte material and an electrode in an electrochemical device. In one non-limiting embodiment, there is disclosed a method to decrease the interfacial resistance between metallic sodium and a sodium-β"-alumina electrolyte. The approach includes polishing the surface of the sodium-β"-alumina ceramic followed by a heat treatment in inert atmosphere. In a second step, metallic sodium is placed on the sodium-β"-alumina ceramic applying a stack pressure in order to increase the adhesion of sodium on the ceramic electrolyte. This technique of forming sodium/sodium-β"-alumina interfaces results in an interfacial resistance <10 ohm cm$^2$ at room temperature and <3 ohm cm$^2$ at 60° C., enabling critical current densities of 12 mA/cm$^2$ and 18 mA/cm$^2$, respectively. This demonstrates the capability of using a solid-solid sodium/sodium-β"-alumina interface without surface modification or an interfacial layer in next-generation solid-state sodium-based batteries.

In one aspect, the present disclosure provides a method for forming a solid state electrolyte. The method can comprise: (a) providing a precursor electrolyte having a resistive surface region, wherein the precursor electrolyte comprises metal cation-alumina; (b) removing at least a portion of the resistive surface region; and (c) heating the precursor electrolyte thereby forming a solid state electrolyte. The metal cation can be selected from the group consisting of cations of an alkali metal. The alkali metal can be sodium. The alkali metal can be lithium. The metal cation-alumina can be selected from the group consisting of sodium-β-alumina and sodium-β"-alumina. The metal cation-alumina can be sodium-β"-alumina, and the precursor electrolyte further comprise a stabilizer for the sodium-β"-alumina. The stabilizer can be selected from the group consisting of Li2O, MgO, NiO, CoO, ZnO, and mixtures thereof.

In the method, step (a) can comprise combining a first solid comprising aluminum, a second solid comprising sodium, and a third solid comprising lithium to form a mixture, and sintering the mixture to form the precursor electrolyte. In the method, step (b) can comprise removing the portion of the resistive surface region with abrasive particles. In the method, step (c) can comprise heating the precursor electrolyte at a temperature in a range of 400° C. to 1600° C. In the method, step (c) can comprise heating the precursor electrolyte at the temperature for 0.1 seconds to 5 hours. In the method, step (c) can comprise heating the precursor electrolyte in an inert atmosphere.

In another aspect, the present disclosure provides a method for forming an electrochemical device. The method can comprise: (a) providing a precursor electrolyte having a resistive surface region, wherein the precursor electrolyte comprises metal cation-alumina; (b) removing at least a portion of the resistive surface region; (c) heating the precursor electrolyte thereby forming a solid state electrolyte; and (d) placing a side of the solid state electrolyte in contact with an electrode to form a electrochemical device. In the method, step (d) can further comprise pressing the solid state electrolyte and the electrode together using a force in a range of 0.01 MPa to 10 MPa. The electrode can comprise sodium metal, and the metal cation-alumina can be sodium-β"-alumina. An area-specific resistance between the electrode and the solid state electrolyte can be less than 100 ohm cm$^2$. The method can further comprise placing an opposite side of the solid state electrolyte in contact with a second electrode to form an electrochemical cell. A critical current density of the electrochemical cell at room temperature can be greater than 2 mA/cm$^2$.

The electrode can be an anode consisting essentially of a metal selected from the group consisting of sodium, lithium, potassium, calcium, magnesium, zinc, nickel, aluminum, barium, and strontium. The metal can be sodium. The second electrode can be a cathode comprising an active material selected from the group consisting of layered metal oxides, metal halides, polyanionic compounds, porous carbon, and sulfur containing materials. The electrode can be an anode comprising a cation host material. The electrode can be an anode comprising a sodium host material, and the sodium host material can be selected from the group consisting of (i) sodium-doped silicon, germanium, tin, lead, antimony, bismuth, zinc, aluminum, titanium, cobalt, nickel, manganese, cadmium, and mixtures thereof, (ii) sodium-containing alloys of silicon, germanium, tin, lead, antimony, bismuth, zinc, aluminum, titanium, cobalt, nickel, manganese, cadmium, and mixtures thereof; (iii) sodium-containing oxides, carbides, nitrides, sulfides, phosphides, selenides, tellurides and mixtures thereof; and (iv) carbon. The second electrode can be a cathode comprising an active material selected from the group consisting of layered metal oxides, metal halides, polyanionic compounds, porous carbon, and sulfur containing materials.

In another aspect, the present disclosure provides an electrochemical device comprising a solid state electrolyte comprising metal cation-alumina; and an electrode in contact with a side of the solid state electrolyte, wherein an area-specific resistance between the electrode and the solid state electrolyte is less than 10 ohm cm$^2$ at room temperature. The electrode can comprise sodium metal, and the metal cation-alumina can be sodium-β"-alumina. The electrochemical device can further comprise a second electrode in contact with an opposite side of the solid state electrolyte thereby forming an electrochemical cell. A critical current density of the electrochemical cell at room temperature is preferably greater than 2 mA/cm$^2$.

The electrode can be an anode consisting essentially of a metal selected from the group consisting of sodium, lithium, potassium, calcium, magnesium, zinc, nickel, aluminum, barium, and strontium. The metal can be sodium. The second electrode can be a cathode comprising an active material selected from the group consisting of layered metal oxides, metal halides, polyanionic compounds, porous carbon, and sulfur containing materials. The electrode can be an anode comprising a cation host material. The electrode can be an anode comprising a sodium host material, and the sodium host material can be selected from the group consisting of (i) sodium-doped silicon, germanium, tin, lead, antimony, bismuth, zinc, aluminum, titanium, cobalt, nickel, manganese, cadmium, and mixtures thereof, (ii) sodium-containing alloys of silicon, germanium, tin, lead, antimony, bismuth, zinc, aluminum, titanium, cobalt, nickel, manganese, cadmium, and mixtures thereof; (iii) sodium-containing oxides, carbides, nitrides, sulfides, phosphides, selenides, tellurides and mixtures thereof; and (iv) carbon. The second electrode can be a cathode comprising an active material selected from the group consisting of layered metal oxides, metal halides, polyanionic compounds, porous carbon, and sulfur containing materials.

The foregoing and other aspects and advantages of the invention will appear from the following description. In the description, reference is made to the accompanying drawings which form a part hereof, and in which there is shown by way of illustration an example embodiment of the invention. Such embodiment does not necessarily represent the full scope of the invention, however, and reference is made therefore to the claims and herein for interpreting the scope of the invention.

BRIEF DESCRIPTION OF DRAWINGS

The patent or application file contains at least one drawing executed in color. Copies of this patent or patent application publication with color drawing(s) will be provided by the Office upon request and payment of the necessary fee.

The invention will be better understood and other features, aspects and advantages will become apparent when consideration is given to the claims and to following detailed description which makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

The various embodiments described herein provide methods for forming an interface between a solid state electrolyte and a sodium metal anode.

The term "critical current density (CCD)" as used herein can refer to the current density a solid electrolyte can support before failure is observed.

The term "area-specific resistance (ASR)" as used herein can refer to the area specific resistance of any component, but is generally used to define the resistance between the metal anode and solid electrolyte interface.

Figure 1:
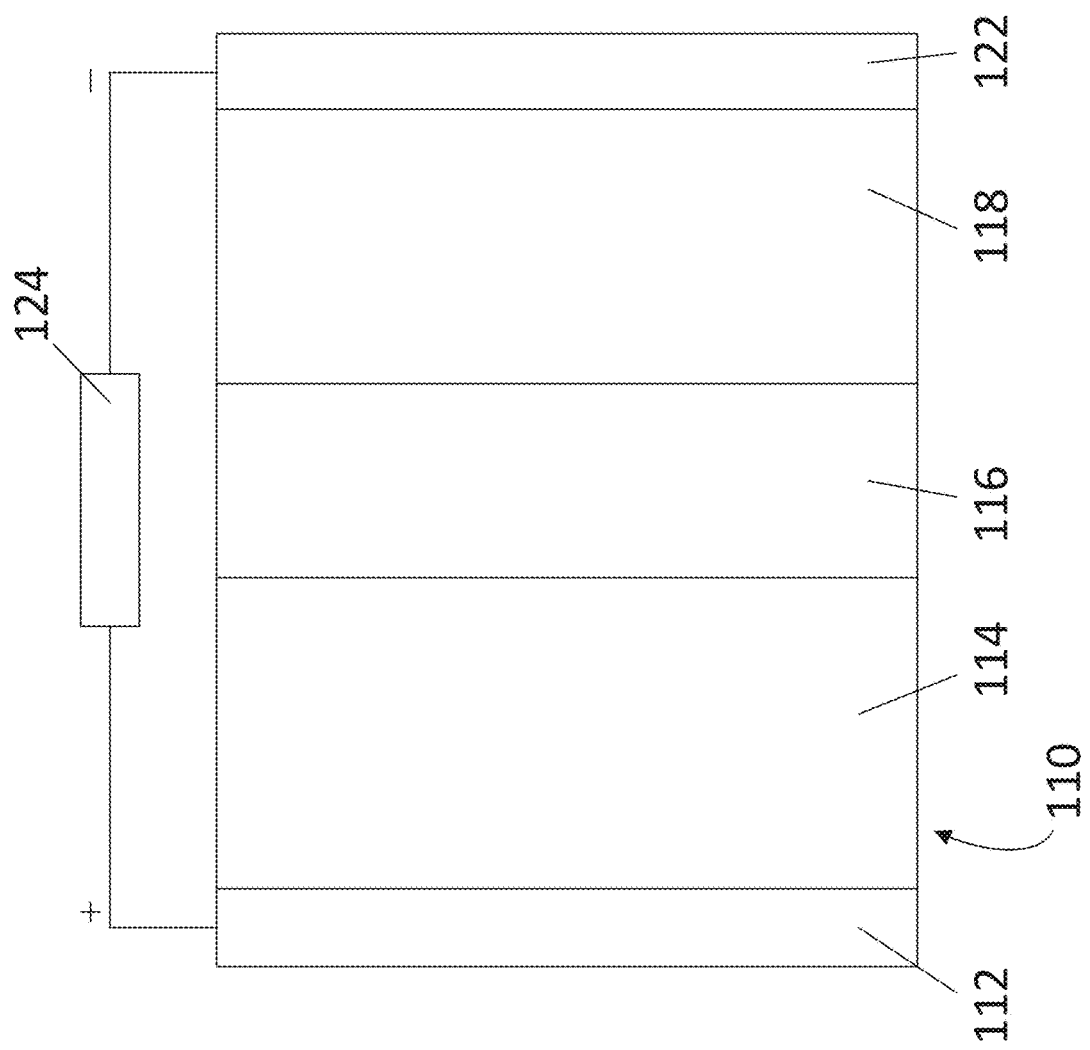
FIG. 1 is a schematic of a sodium metal battery.

One embodiment described herein relates to a method for reducing the ASR at the interface between the solid state electrolyte and the anode by removing the resistive species. In one non-limiting example application, a solid state electrolyte 116 can be used in a sodium metal battery 110 as depicted in FIG. 1. The sodium metal battery 110 includes a current collector 112 (e.g., aluminum) in contact with a cathode 114. A solid state electrolyte 116 is arranged between the cathode 114 and an anode 118, which is in contact with a current collector 122 (e.g., aluminum). The current collectors 112 and 122 of the sodium ion battery 10 may be in electrical communication with an electrical component 124. The electrical component 124 could place the sodium metal battery 110 in electrical communication with an electrical load that discharges the battery or a charger that charges the battery. The sodium metal battery 110 can operate at room temperature.

The first current collector 112 and the second current collector 122 can comprise a conductive metal or any suitable conductive material. In some embodiments, the first current collector 112 and the second current collector 122 comprise aluminum, nickel, copper, combinations and alloys thereof. In other embodiments, the first current collector 112 and the second current collector 122 have a thickness of 0.1 microns or greater. It is to be appreciated that the thicknesses depicted in FIG. 1 are not drawn to scale, and that the thickness of the first current collector 112 and the second current collector 122 may be different.

A suitable active material for the cathode 114 of the sodium metal battery 110 is a sodium host material capable of storing and subsequently releasing sodium ions. Non-limiting example cathode active materials can be selected from the group consisting of layered metal oxides, metal halides, polyanionic compounds, porous carbon, and sulfur containing materials. Example layered metal oxides include NaFeO, NaMnO, NaTiO, NaNiO, NaCrO, NaCoO, and NaVO. Example metal halides have the formula $MX_m$ wherein M can be selected from nickel, iron, copper, zinc, cadmium, titanium, aluminum, and tin, X can be selected from iodine, bromine, chlorine, and fluorine, and m corresponds to the valence of the metal M. Non-limiting examples of polyanionic compounds include $Na_3V_2(PO_4)_3$, $Na_2Fe_2(SO_4)_3$, $NaFePO_4$, $NaFeP_2O_7$, $Na_2MP_2O_7$ (wherein M is at least one of Fe, Ni, Co and Mn), and $Na_4M_3(PO_4)_2P_2O_7$ (wherein M is at least one of Fe, Ni, Co and Mn). Porous carbon is suitable for a sodium air battery, and a sulfur containing material is suitable for a sodium sulfur battery. The cathode active material can be a mixture of any number of these cathode active materials.

In some embodiments, the anode 118 of the sodium metal battery 110 consists of sodium metal. In other embodiments, an example anode 118 material consists essentially of sodium metal.

In an alternative embodiment, the anode comprises a sodium host material selected from the group consisting of (i) sodium-doped silicon, germanium, tin, lead, antimony, bismuth, zinc, aluminum, titanium, cobalt, nickel, manganese, cadmium, and mixtures thereof; (ii) sodium-containing alloys of silicon, germanium, tin, lead, antimony, bismuth, zinc, aluminum, titanium, cobalt, nickel, manganese, cadmium, and mixtures thereof; (iii) sodium-containing oxides, carbides, nitrides, sulfides, phosphides, selenides, tellurides and mixtures thereof; and (iv) carbon. The anode can be a mixture of any number of these sodium host materials.

The electrolyte 116 of the sodium metal battery 110 can be a solid state electrolyte material comprising a metal cation-alumina, preferably a metal cation-β-alumina and metal cation-β"-alumina. The metal cation can be selected from the group consisting of cations of an alkali metal. The metal cation is preferably sodium. The metal cation-alumina can sodium-β-alumina and sodium-β"-alumina. Preferably, the solid state electrolyte material comprises sodium-β"-alumina. The solid state electrolyte material can further comprise a stabilizer for the sodium-β"-alumina. A stabilizing amount of a stabilizer can be selected from the group consisting of $Li_2O$, MgO, NiO, CoO, ZnO, and mixtures thereof.

In another non-limiting example application, the solid state electrolyte can be used in a lithium metal battery. A suitable active material for the cathode of the lithium metal battery is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of a cathode active material is a lithium-containing phosphate having a general formula LiMPO$_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on dilithiation and cycling performance of the cathode materials. In some embodiments, a suitable active material for the anode of the lithium metal battery consists of lithium metal. In other embodiments, an example anode material consists essentially of lithium metal. In an alternative embodiment, the anode comprises a lithium host material such as graphite.

In still other non-limiting example applications, the solid state electrolyte can be used in an intercalation battery having a cation chemistry other than sodium or lithium. For example, the anode of the battery may consist essentially of a metal selected from the group consisting of potassium, calcium, magnesium, zinc, nickel, aluminum, barium, and strontium. The cathode may comprise an active material capable of storing and releasing cations of potassium, calcium, magnesium, zinc, nickel, aluminum, barium, strontium, silver, or thallium.

The present disclosure provides a method for forming a solid state electrolyte. The method includes the steps of (a) providing a precursor electrolyte having a resistive surface region, wherein the precursor electrolyte comprises a metal cation-alumina, preferably a metal cation-β-alumina or a metal cation-β"-alumina; (b) removing at least a portion of the resistive surface region; and (c) heating the precursor electrolyte thereby forming the solid state electrolyte. One non-limiting example precursor electrolyte can be formed by combining a first solid comprising aluminum (e.g., AlO(OH)), a second solid comprising sodium (e.g., Na$_2$CO$_3$), and a third solid comprising lithium (e.g., LiOH) to form a mixture, and sintering the mixture to form the precursor electrolyte. One can remove the portion of the resistive surface region with abrasive particles.

In some embodiments, heating the precursor electrolyte to remove at least a portion of the resistive surface region occurs at a temperature greater than 180° C., or greater than 200° C., or greater than 250° C., or greater than 300° C., or greater than 350° C., or greater than 400° C., or greater than 450° C., or greater than 500° C., or greater than 550° C., or greater than 600° C., or greater than 650° C., or greater than 700° C., or greater than 750° C., or greater than 800° C., or greater than 850° C., or greater than 900° C., or greater than 950° C., or greater than 1000° C. Preferably, heating the precursor electrolyte occurs at a temperature in a range of 400° C. to 1600° C. Alternatively, heating the precursor electrolyte can occur at a temperature in a range of 400° C. to 1600° C., or 500° C. to 1000° C., or 500° C. to 1200° C., or 500° C. to 1300° C., or 500° C. to 1500° C., or 600° C. to 1600° C.

Heating the precursor electrolyte to remove at least a portion of the resistive surface region can occur for any amount of time, and can be performed at any pressure including above, at, or below atmospheric pressure. Preferably, the precursor electrolyte is heated at the temperature for 0.1 seconds to 5 hours, or 1 to 5 hours, or 2 to 4 hours.

In some embodiments, heating the precursor electrolyte to remove at least a portion of the resistive surface region occurs in ambient air. In other embodiments, heating the precursor electrolyte to remove at least a portion of the resistive surface region occurs in an atmosphere without the presence of moisture or $CO_2$. In some embodiments, the atmosphere includes an inert gas. A suitable inert gas includes helium, argon, neon, xenon, krypton, radon, and nitrogen.

In some embodiments, heating the precursor electrolyte to remove at least a portion of the resistive surface region includes removing between 0.1% and 99.9% of the resistive surface region. In some embodiments, heating the precursor electrolyte removes 5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater of the resistive surface region.

The present disclosure also provides a method for forming an electrochemical device. The method comprises the steps of (a) providing a precursor electrolyte having a resistive surface region, wherein the precursor electrolyte comprises a metal cation-alumina, preferably a metal cation-β-alumina or a metal cation-β"-alumina; (b) removing at least a portion of the resistive surface region; (c) heating the precursor electrolyte thereby forming a solid state electrolyte; and (d) placing a side of the solid state electrolyte in contact with an electrode to form an electrochemical device. Step (d) may further comprise pressing the solid state electrolyte and the electrode together using a force in a range of 0.01 MPa to 10 MPa. In one version of the method, the electrode comprises sodium metal, and the metal cation-alumina is sodium-β"-alumina. After placing a side of the solid state electrolyte in contact with the electrode, an area-specific resistance between the electrode and the solid state electrolyte is less than 200 ohm cm$^2$, or less than 100 ohm cm$^2$, or less than 75 ohm cm$^2$, or less than 50 ohm cm$^2$, or less than 25 ohm cm$^2$, or less than 10 ohm cm$^2$, or less than 5 ohm cm$^2$, or less than 3 ohm cm$^2$, or less than 2 ohm cm$^2$.

Before, during or after forming the electrochemical device, one can place an opposite side of the solid state electrolyte in contact with a second electrode to form an electrochemical cell. After forming the electrochemical cell, a critical current density of the electrochemical cell at room temperature is greater than 2 mA/cm$^2$, or greater than 3 mA/cm$^2$, or greater than 4 mA/cm$^2$, or greater than 5 mA/cm$^2$, or greater than 8 mA/cm$^2$, or greater than 10 mA/cm$^2$, or greater than 12 mA/cm$^2$, or greater than 15 mA/cm$^2$, or greater than 20 mA/cm$^2$.

Example

The following Example is provided in order to demonstrate and further illustrate certain embodiments and aspects of the present invention and is not to be construed as limiting the scope of the invention.

Overview

All-solid-state batteries with an alkali metal anode have the potential to achieve high energy density. However, the onset of dendrite formation limits the maximum plating current density across the solid electrolyte and prevents fast charging. It was shown that the maximum plating current density is related to the interfacial resistance between the solid electrolyte and the metal anode. Due to their high ionic conductivity, low electronic conductivity, and stability against sodium metal, Na-β"-alumina ceramics are excellent candidates as electrolytes for room-temperature all-solid-state batteries. Herein, we demonstrate that a heat treatment of Na-β"-alumina ceramics in argon atmosphere enables an interfacial resistance <10 Ωcm$^2$ and critical current densities up to 12 mA/cm$^2$ at room temperature. The critical current density obtained for Na-β"-alumina is ten times higher than that measured on a garnet-type Li$_7$La$_3$Zr$_2$O$_{12}$ electrolyte under equivalent conditions. X-ray photoelectron spectroscopy shows that eliminating hydroxyl groups and carbon contaminations at the interface between Na-β"-alumina and sodium metal is key to reach such values. By comparing the temperature-dependent stripping/plating behavior of Na-β"-alumina and Li$_7$La$_3$Zr$_2$O$_{12}$, we discuss the role of the alkali metal in governing interface kinetics. This Example provides new insights into dendrite formation and paves the way for fast-charging all-solid-state batteries. Specifically, sodium plating up to 12 mA/cm$^2$ on Na-β"-alumina ceramics at room temperature paves the way for fast-charging all-solid-state sodium batteries

INTRODUCTION

Enabling reversible stripping and plating of alkali metals at current densities >10 mA/cm$^2$ at room temperature is key for enabling next-generation batteries with an energy and power density surpassing that of established battery technologies. However, repeated cycling of a lithium metal anode in a liquid electrolyte leads to the formation of lithium metal dendrites that short-circuit the cell and constitute a safety hazard [Ref. 1]. A similar phenomenon is observed in solid electrolytes employed in all-solid-state batteries, where lithium metal tends to deposit inside the electrolyte upon repeated cycling resulting ultimately in a short circuit between the anode and the cathode [Refs. 2-5].

While the underlying mechanisms are still under debate, it was shown that the critical current density (CCD) for dendrite formation is related to the interfacial resistance between the solid electrolyte and the metal anode [Ref. 6]. Several strategies have been adopted to reduce the interfacial resistance, e.g., at the interface between a Li$_7$La$_3$Zr$_2$O$_{12}$ (LLZO) electrolyte and a lithium metal anode. LLZO is currently investigated intensively because of its high ionic conductivity (~1 mS/cm at room temperature) and high stability towards lithium metal [Refs. 7, 8]. Strategies include the use of interfacial layers (e.g., Au [Ref. 9], Ge [Ref. 10]), heat treatments to remove surface contamination from the electrolyte [Ref. 6], or promoting contact by pressurizing the cell during cycling [Refs. 11, 12]. Despite obtaining interfacial resistance values comparable to values measured for the interface between a liquid electrolyte and lithium metal, CCD values remain below fast charging requirements (e.g., 10 mA/cm$^2$ corresponding to an areal charge capacity of 5 mAh/cm$^2$ charged/discharged at 2C [Ref. 13]).

In this Example, we investigate Na-β"-alumina ceramics as an electrolyte candidate for fast-charging all-solid-state batteries. Owing to its high ionic conductivity, low electronic conductivity, and stability against sodium metal, Na-β"-alumina is already commercially employed in high-temperature sodium-nickel-chloride (NaNiCl) and sodium-sulfur (NaS) batteries operating near 300° C. [Refs. 14, 15, 16]. However, high interfacial resistance, possibly associated with poor sodium wetting and the presence of surface impurities, has impeded its use as solid electrolyte for room temperature batteries [Ref. 16].

Herein we show that by applying a heat treatment in argon atmosphere to a finely polished Na-β"-alumina surface, a low interfacial resistance to sodium metal <10 Ωcm$^2$ can be achieved, enabling CCD values of 12 mA/cm$^2$ at room temperature fulfilling fast charging requirements. We also investigate the dependence of the CCD values on the total charge transferred. Compared to LLZO, we observe a tenfold increase in current density despite similar transference numbers. We also discuss the critical role of the electronic conductivity of the electrolyte and the melting temperature of the alkali metal on the CCD.

Materials And Methods

Spray-dried Li-stabilized Na-β"-alumina powders were prepared by solid-state synthesis from boehmite (AlO(OH)), lithium hydroxide (LiOH), and sodium carbonate (Na$_2$CO$_3$) [Ref. 17]. Powders were pressed into green bodies of 15 millimeter diameter. These were sintered for 5 minutes at 1600° C. in static air in a high-temperature laboratory furnace (Carbolite Gero HTF 1700) applying constant heating and cooling rates of 3° C./min. To mitigate sodium (and lithium) loss and to facilitate shrinkage during sintering, samples were placed on green buffer discs made from the same Na-β"-alumina powder. Samples and buffer discs were encapsulated within a dense magnesium-spinel dome and a corresponding magnesium-spinel support disc with a constant ratio of Na-β"-alumina mass (samples plus buffer disc) to encapsulated volume of 0.14 g/cm$^3$. The pellets were then ground plan-parallel with increasingly finer sandpapers and polished with a succession of diamond pastes to a final polish using 0.1 μm diamond paste. The resulting pellets had final dimensions of 1.4±0.3 millimeters thickness and 12.7 millimeters diameter. The samples were then heat treated in argon atmosphere for 3 hours at temperatures between 400° C. and 900° C.

Cell assembly and electrochemical characterization were performed under argon atmosphere in a glovebox. The heat-treated Na-β"-alumina ceramics were first masked on both sides to an area of 0.49 cm$^2$ using polyimide foil. Mechanically cleaned sodium foils were then pressed onto both sides of the masked pellets at a pressure of 3.4 MPa. Electrochemical characterization was performed using a Biologic VMP-300 galvanostat/potentiostat using nickel current collectors at a pressure of 3.4 MPa in an argon glovebox. The temperature-dependent ion-conductivity of Na-β"-alumina was extracted from potentiostatic electrochemical impedance spectroscopy (PEIS) data measured at frequencies between 0.5 Hz and 7 MHz with a 20 mV sinusoidal amplitude. The temperature-dependent electronic conductivity was determined by a DC polarization method applying staircase potentiometry (Mott-Schottky) at 1 V, 2 V, and 3 V vs Na/Na$^+$. The assessment of the critical current density (CCD) was performed by galvanostatic measurements applying an initial pressure of 3.4 MPa. The current density was increased at each cycle while transferring a constant charge of 0.25 mAh/cm$^2$ or 3 mAh/cm$^2$. PEIS was conducted before and after each plating and stripping cycle. CCD was defined as the current density when short-circuit of the cell occurred, indicated by a sudden drop in potential response and cell impedance. CCD values are given as the average over 3 to 4 measurements and the error bars represent the maximum and minimum values.

X-ray photoelectron spectroscopy (XPS) measurements were performed at room temperature on a PHI Quantum 2000 using a monochromated Al Kα X-ray source (1484.6 eV) with a pass energy of 30 eV. All measurements were conducted on three different areas, 150 μm in diameter, of each sample. Sample charging was prevented by charge compensation provided by a low energy electron gun. XPS data were processed with the CasaXPS software. Spectra were calibrated by setting the hydrocarbon component of the C 1s photoemission peak to 285.0 eV binding energy.

Results and Discussion

Figure 2:
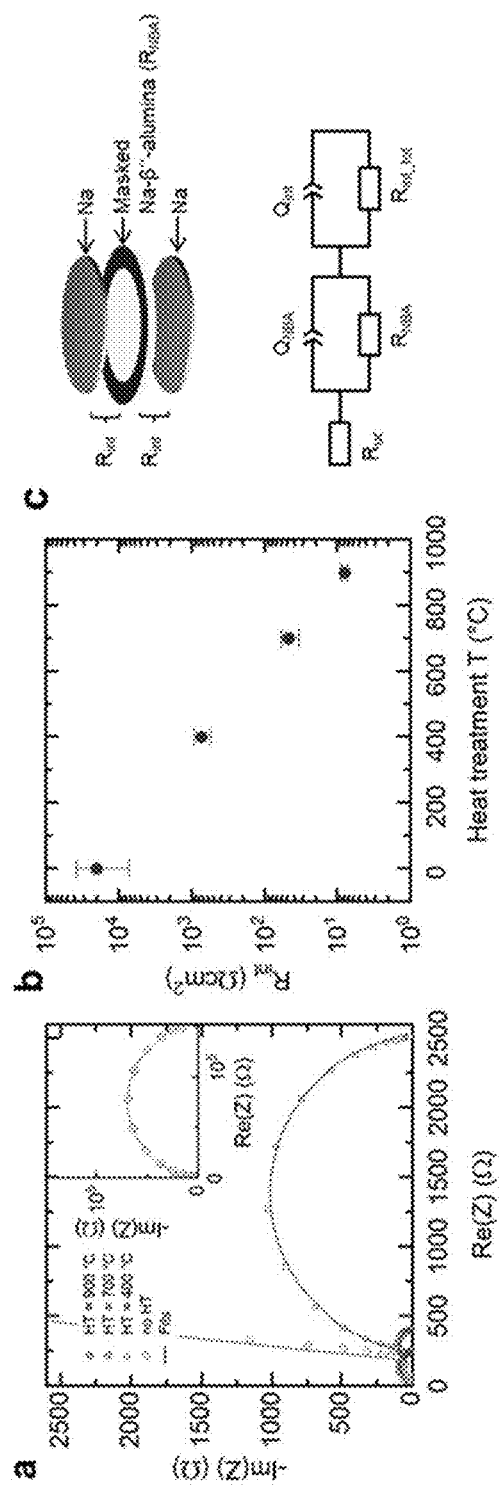
FIG. 2 shows the impact of heat-treatment (HT) temperature on interfacial resistance wherein (a) is representative Nyquist plots for the different heat-treatment temperatures where markers represent experimental data and lines represent the fitted data, (b) shows interfacial resistance as a function of heat-treatment temperature, and (c) is a schematic of the symmetric Na/Na-β"-alumina/Na cell and equivalent circuit for fitting the impedance spectra.

Impact of Heat Treatment Temperature on Interfacial Resistance and Interface Chemistry To study the impact of a heat treatment on the interfacial resistance ($R_{int}$) between sodium metal and Na-$\beta$"-alumina, potentiostatic electrochemical impedance spectroscopy (PEIS) measurements were conducted on Na-$\beta$"-alumina pellets heat treated in argon at temperatures between 400° C. and 900° C. and compared to as-polished untreated samples. These measurements were performed on symmetric Na/Na-$\beta$"-alumina/Na cells as depicted in (c) of FIG. 2. A mask was applied on Na-$\beta$"-alumina to obtain a well-defined contact area between Na-$\beta$"-alumina and the Na disc and a pressure of 3.4 MPa was applied during PEIS measurements. Representative Nyquist plots for the various heat-treatment conditions are shown in (a) of FIG. 2. The PEIS spectra reveal two semi-circles representing the impedance contributions from the Na-$\beta$"-alumina ceramic characterized by an apex frequency of $4.3 \times 10^5$ Hz and from the Na/Na-$\beta$"-alumina interface characterized by an apex frequency ranging from 10 to 400 Hz. While the Na-$\beta$"-alumina contribution remains constant, the interface contribution is drastically reduced with increasing heat-treatment temperature. To quantify the change in interfacial resistance with the heat-treatment temperature, the PEIS spectra were fitted with two parallel R/CPE circuits in series together with an additional resistance ($R_{uc}$) to account for any uncompensated resistances, e.g., from the cell casing and electrical connections (see (c) of FIG. 2). The interfacial resistances were normalized by the mask area and divided by two because of the two interfaces measured. The results of the fits are presented in Table 1 and in (b) of FIG. 2 in a semi-logarithmic scale as a function of the heat-treatment temperature. A significant decrease of the interfacial resistance from tens of thousands of $\Omega$ cm$^2$ for non-heat-treated samples to 8 $\Omega$cm$^2$ is achieved by heat treating the Na-$\beta$"-alumina pellets at 900° C., while the CPE values increases by two orders of magnitude. Heat treating Na-$\beta$"-alumina ceramics in argon atmosphere represents thus a very effective method to reduce the interfacial resistance to sodium metal.

TABLE 1

Fitting results of the interfacial resistance ($R_{int}$) and capacitance (CPE) for the various heat-treatment (HT) conditions.

| HT | $R_{int}$ ($\Omega$cm$^2$) | CPE (Fs$^{a-1}$) |
|---|---|---|
| None | 19909 | $2.7 \times 10^{-7}$ |
| 400° C. | 735 | $4.1 \times 10^{-7}$ |
| 700° C. | 47 | $1.4 \times 10^{-6}$ |
| 900° C. | 8 | $1.8 \times 10^{-5}$ |

Figure 3:
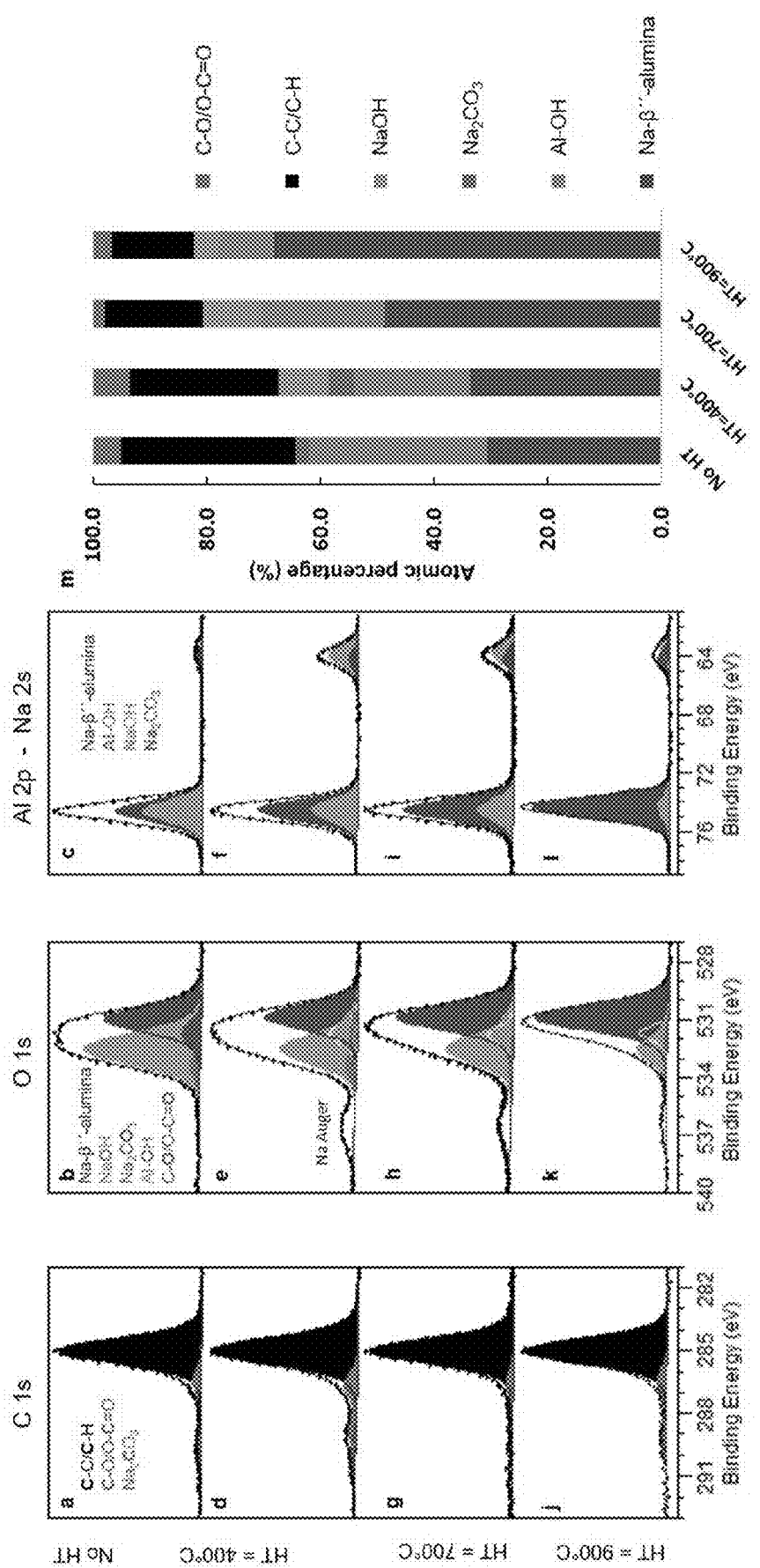
FIG. 3 shows XPS peaks of C 1s, O 1s and Al 2p-Na 2s core levels of the Na-β"-alumina before heat treatment in (a) to (c), and after heat treatment under Ar atmosphere at 400° C. in (d) to (f), at 700° C. in (i) to (k), and at 900° C. in (l) to (n), respectively and a summary of surface chemical composition, estimated by XPS, for all Na-β"-alumina samples in (m).

To investigate the effect of the heat treatment on the Na-$\beta$"-alumina electrolyte surface, we performed XPS on Na-$\beta$"-alumina pellets before and after heat treatment at 400° C., 700° C., and 900° C. Spectra of the C 1s, O 1s, Al 2p, and Na 2s core levels are shown in FIG. 3. The results are summarized in (m) of FIG. 3. The main peak in the C 1 s spectra at 285.0 eV (by calibration) is attributed to adventitious carbon species (C—C/C—H). Oxidized carbon contamination (C—O and O—C=O) is detected at higher binding energies. Only a very small amount of NaCO$_3$ (<1 atomic %) is detected at the surface above 289 eV before and after heat treatment of 400° C. and is no longer detected after heat treatment at higher temperatures.

The O 1s peak for the non-treated Na-$\beta$"-alumina is very broad and cannot be fitted with a single component. The width of this peak reduces significantly with increasing heat treatment temperature accompanied by the formation of a small shoulder on the high binding energy side. Following Kloprogge et al., "XPS study of the major minerals in bauxite: Gibbsite, bayerite and (pseudo-)boehmite", *Journal of Colloid and Interface Science*, Volume 296, Issue 2, 15 Apr. 2006, pages 572-576, we choose to take two main components to fit this peak representing oxygen (Al—O, ~530.9 eV) in the crystal structure and hydroxyl (Al—OH, 532.5 eV) groups present at the surface. In addition, oxygen atoms bound to carbon (C—O, O—C=O, NaCO$_3$) are taken into account in the ratio determined from the C 1s peak, corrected for their respective photoelectron cross sections and chemical formula. Interestingly, while the Al—OH component is comparable in area to the Al—O component, it reduces significantly after heat treatment at 900° C. This is strong evidence that reducing the amount of hydroxyl groups at the interface is key to obtain low ionic interfacial resistance to sodium metal.

For completeness, we also show the Al 2p and Na 2s spectra in FIG. 3. Following Kloprogge et al. and Zahr et al., "Characterisation of oxide and hydroxide layers on technical aluminum materials using XPS", *Vacuum*, Volume 86, Issue 9, 14 Mar. 2012, pages 1216-1219, we refrain from deconvoluting the Al 2p doublet into an Al—O and Al—OH component with different binding energy and the peak area ratio between the components is constraint to the value calculated from the analysis of the O 1 s peak. Note that the presence of the Al 2p peak confirms that the surface contamination layer is thinner than the photoelectron inelastic mean free path.

Temperature-Dependent Transport Properties

Figure 4:
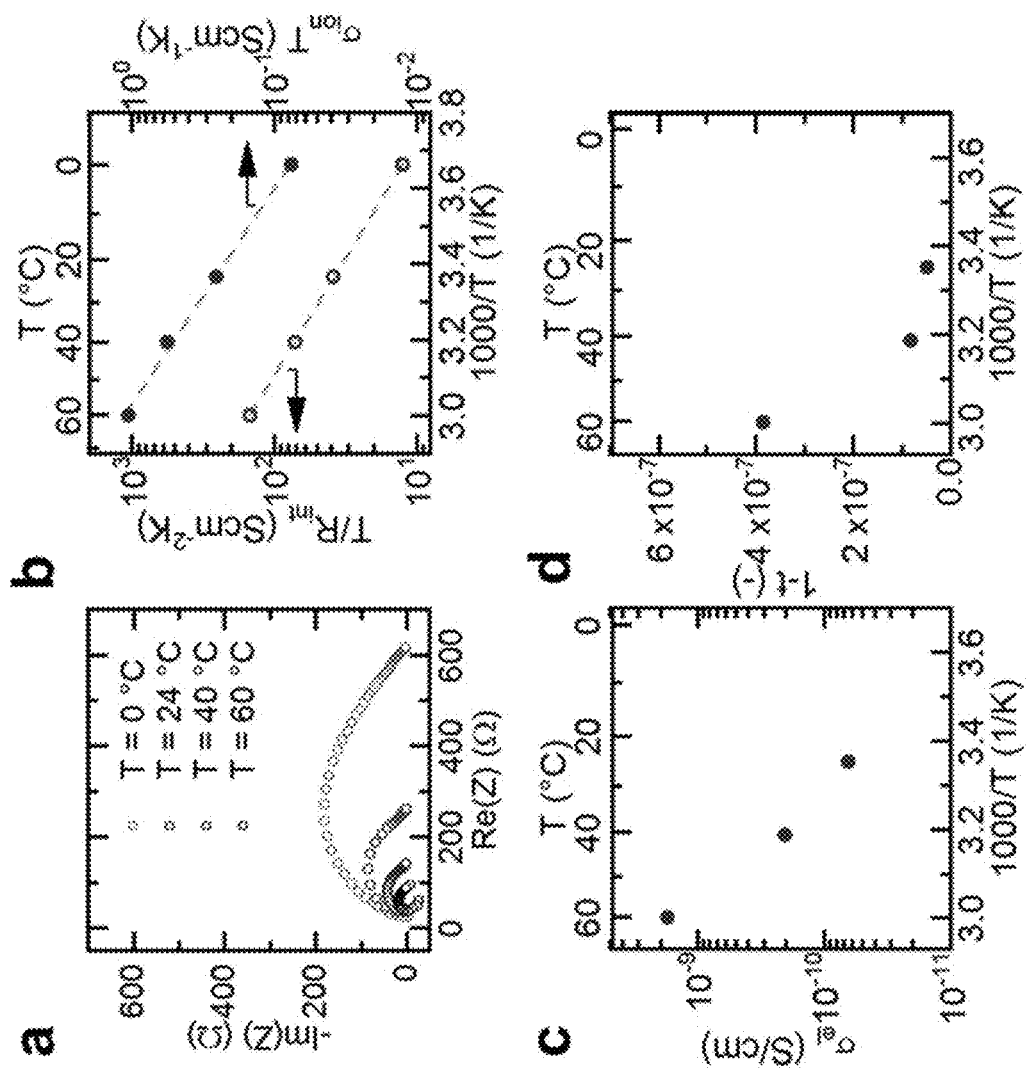
FIG. 4 shows in (a), representative Nyquist plots as a function of temperature; in (b) temperature-dependent interfacial resistance and ionic conductivity; in (c), electronic conductivity; and in (d), ionic transference number t plotted as 1-t for readability.

In order to better understand the transport kinetics at the Na/Na-$\beta$"-alumina interface, we analyze the different conduction processes as a function of temperature. Plot (a) of FIG. 4 exemplarily shows Nyquist plots of Na/Na-$\beta$"-alumina/Na cells measured from 0° C. to 60° C. It is clear that the impedance of both the Na-$\beta$"-alumina ceramic and the interface decrease as the temperature increases. Extracting both contributions using the equivalent circuit of (c) in FIG. 2 results in the temperature-dependent ion conductivity and interfacial resistance shown in (b) of FIG. 4. The ionic conductivity of the Na-$\beta$"-alumina ceramic at room temperature is 1.3 mS/cm and follows an Arrhenius behavior with activation energy of 0.35 eV derived from a linear fit of ln($\sigma_{ion}$T) vs 1000/T. In comparison, the interfacial process follows an Arrhenius behavior with similar activation energy of 0.32 eV derived from a linear fit of ln(T/$R_{int}$) vs 1000/T, indicating that the charge transfer process is not hampered at the interface. As pressure is applied during the measurements, a good contact is expected to be maintained also at low temperatures. Therefore, we attribute the temperature-dependent interfacial resistance to improved kinetics rather than to a change in viscosity of sodium metal with temperature. Additional requirements for solid electrolytes are low electronic conductivity $\sigma_{el}$ and high ionic transference number t. In (c) and (d) of FIG. 4, there is shown the electronic conductivity and ionic transference number t from 0° C. to 60° C., plotted as 1-t for better readability. At room temperature, a low electronic conductivity of $6.4 \times 10^{-11}$ S/cm is measured, which increases only slightly with temperature following an Arrhenius behavior with an activation energy of 0.84 eV. Corresponding transference numbers are close to 1 in this temperature range. Compared to recently published data on electronic conductivity of Na-β"-alumina [Ref. 18], the values for room-temperature electronic conductivity we measure here are smaller by a factor of 10. While the difference may be ascribed to variations in microstructures and phase content, the stabilization time during the DC polarization and the use of two blocking electrodes vs. the use of the Hebb Wagner technique with a metal electrode may also play a role. Overall, the high ionic conductivity coupled to low electronic conductivity of Na-β"-alumina ceramics and interfacial charge transfer process with low resistivity are key enablers for the development of solid-state Na/Na-β"-alumina batteries.

Figure 5:
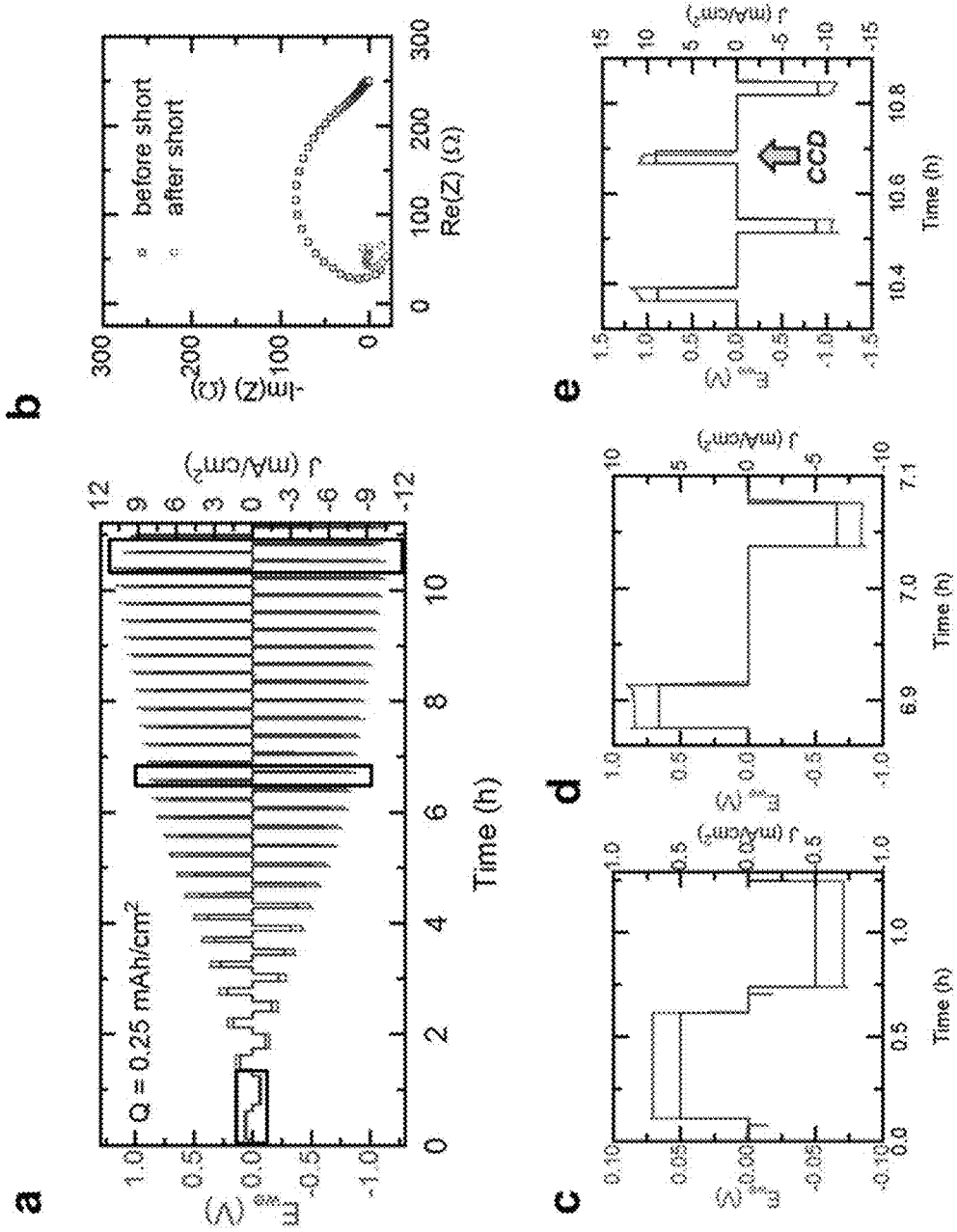
FIG. 5 shows in (a), representative potential response of a Na/NBA/Na cell undergoing CCD measurement at room temperature and charge of 0.25 mAh/cm$^2$ per half cycle; in (b), Nyquist plots before and after short-circuit; in (c), a closer view on the potential response during CCD measurement at low current densities; in (d), a closer view on the potential response during CCD measurement at medium current densities; and in (e), a closer view on the potential response during CCD measurement at close to short circuit, showing an increase of the polarization.

Critical Current Densities in Na-β"-Alumina Ceramics as Function of Charge and $R_{int}$ After demonstrating low interfacial resistance and favorable charge transport properties, we now focus on the sodium stripping/plating behavior in symmetric Na/Na-β"-alumina/Na cells. The critical current densities (CCD) at which dendrites propagate through Na-β"-alumina ceramics were determined by galvanostatic measurements. In order to ensure a good contact between sodium metal and Na-β"-alumina ceramics, 10 cycles of 1 hour at a current density of 10 μA/cm² were first applied [Ref. 19]. CCD measurements were then performed with increasing current density at each cycle, while transferring a constant charge density of 0.25 mAh/cm² to be comparable with recent studies on LLZO. To mitigate formation of voids in sodium metal during stripping as recently demonstrated in lithium metal in contact with LLZO [Ref. 11, 12], the cells were put under pressure at 3.4 MPa. After the measurement, the pressure was recorded to be still about −5% of the initial value. The potential response during a typical CCD measurement is shown in (a) of FIG. 5 for a sample heat-treated at 900° C. In this example, the CCD was reached at 9 mA/cm² as observed by a sudden drop of the potential to 0 V (see arrow in (e) of FIG. 5), indicating a short circuit in the cell due to dendrite formation. In some cases, if the dendrite shorts the cells only locally at point contacts, the potential may partially recover as shown in the example of (e) of FIG. 5. To confirm the short in the cell, PEIS was performed between each stripping/plating cycle. In (b) of FIG. 5, there is shown typical PEIS spectra before and after the CCD was reached. Below the CCD, the spectra are dominated by the electrolyte contribution (as described by parallel connection of RNBA and CPENBA in (c) of FIG. 2). After short-circuiting, the electrolyte contribution is significantly reduced, and the spectra are dominated by a resistive behavior, with some stray inductances and minor capacitance contributions, possibly related to the local point contact of the sodium dendrite. A closer look on the potential response at different stages of the measurement (boxes in (a) of FIG. 5), are shown in (c), (d), and (e) of FIG. 5. At low current densities, the potential response follows an Ohmic behavior, U=RI, where U is the potential, R the total cell resistance, and I the current as observed by the stable potential. Due to negligible interfacial resistance, the overpotential at low current density is given by the electrolyte only. As the current density increases, the potential response deviates from Ohmic behavior until CCD is reached. While an increase of potential was recently ascribed entirely to void formation in lithium metal at the interface to LLZO during stripping [Ref. 12], confirmation that void formation results from stripping would require measurements with a reference electrode.

We now explore the impact of the charge density and interfacial resistance on CCD. In (a) and (b) of FIG. 6, there is shown a comparison of the potential response of cells cycled with charge densities of 0.25 mAh/cm² and 3 mAh/cm², respectively, up to a current density of 6.6 mA/cm². While the cell cycled at a charge density of 0.25 mAh/cm² does not fail up to 6.6 mA/cm², the cell cycled at a charge of 3 mAh/cm² fails at 5.5 mA/cm² as observed by the sudden drop in potential response to 0 V, indicated by the arrow in (b) of FIG. 6. Compared to the potential response of the cell cycled at low charge density, the polarization of the cell cycled at high charge density increases continuously with increasing current density until the cut-off voltage of 4.5 V is reached (axis cut at 1 V for better readability). We ascribe this deviation from Ohmic behavior to void formation in sodium metal near the interface to Na-β"-alumina caused by the long stripping cycles when a larger amount of charge is transferred per cycle. The resulting voids formed at the interface reduce the contact surface area and thus increase the interfacial resistance. To supply a constant current, higher overpotentials are thus needed. Although a reference electrode would be required to decouple stripping from plating effects, early cell failure with increased charge supports the void formation hypothesis. While void formation can be avoided by increasing the pressure [Refs. 11, 12], we performed all CCD measurements with a charge density of 0.25 mAh/cm² to minimize void formation.

Figure 6:
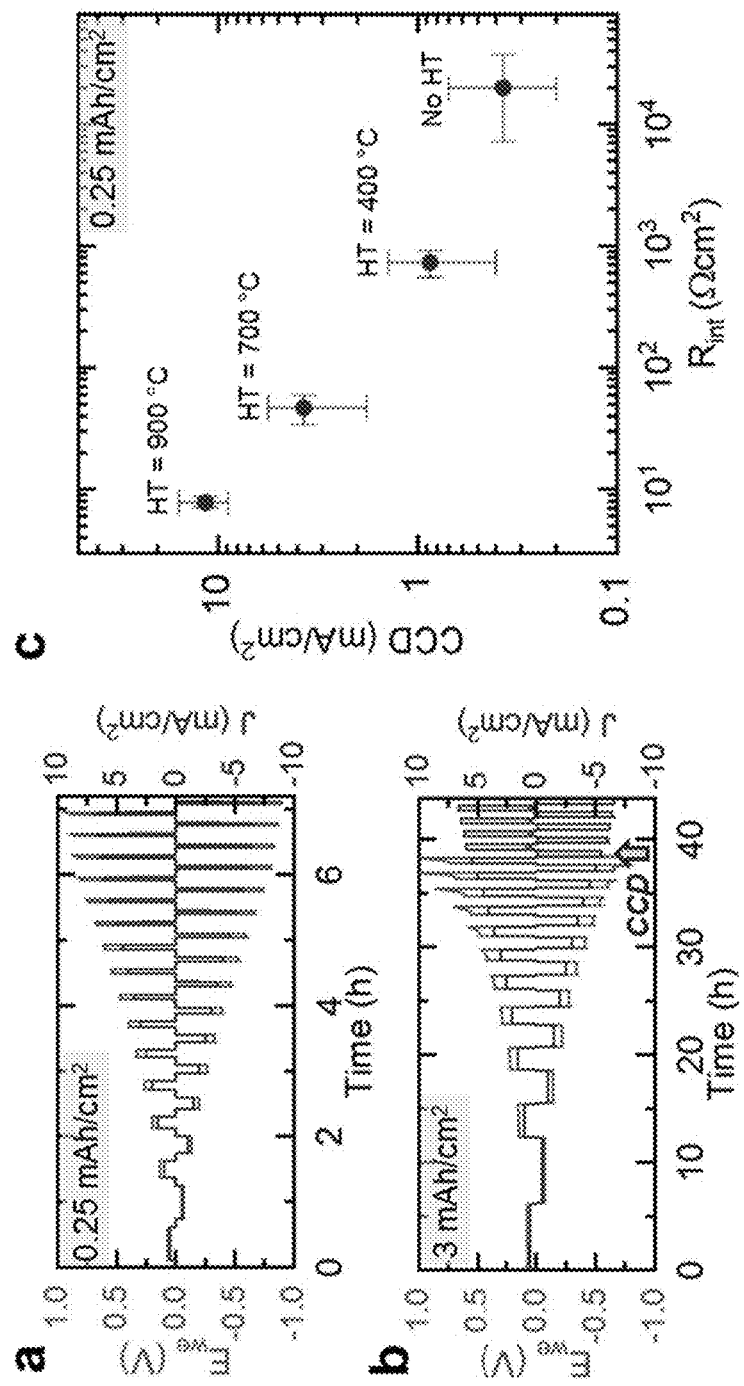
FIG. 6 shows representative potential responses of Na/NBA/Na cells undergoing CCD measurements at total transferred charge per half cycle of Q=0.25 mAh/cm$^2$ in (a) and Q=3 mAh/cm$^2$ in (b) (while the potential response of the two last cycles before failure reached a limit of 4.5 V, the maximum value of the y axis scale bar is 1 V for better readability) wherein a larger amount of total transferred charge leads to higher polarization and to a premature short circuit; and in (c), CCD as a function of interfacial resistance.

The impact of increasing heat treatment (HT) temperature is shown in (c) of FIG. 6. The CCD values increase significantly with decreasing interfacial resistance. As previously reported in [Ref. 6], this effect is attributed to the suppression of localized regions featuring higher current densities, often referred to as "hot spots", which reach the CCD value prematurely. This observation was also made for Na-β"-alumina using a molten sodium metal anode, where higher charge could be passed in cells featuring lower charge transfer resistances [Ref. 20]. For the maximum heat treatment temperature applied, an average CCD value over four samples of 12 mA/cm² is obtained. To the best of our knowledge, this is the highest reported CCD value for a solid electrolyte at room temperature (without implementation of a porous electrolyte layer that locally reduces the current density by increasing the surface area as in [Ref. 21]). Note that the maximum heat-treatment temperature was limited by the furnace to 900° C. While it is possible that higher temperatures may further decrease the interfacial resistance and thus increase the CCD value, void formation at the interface may limit the physical maximum CCD. Nonetheless, this surface treatment gives optimistic results for the implementation of fast-charging all-solid-state batteries.

Temperature-Dependent CCD and Comparison with Literature

Figure 7:
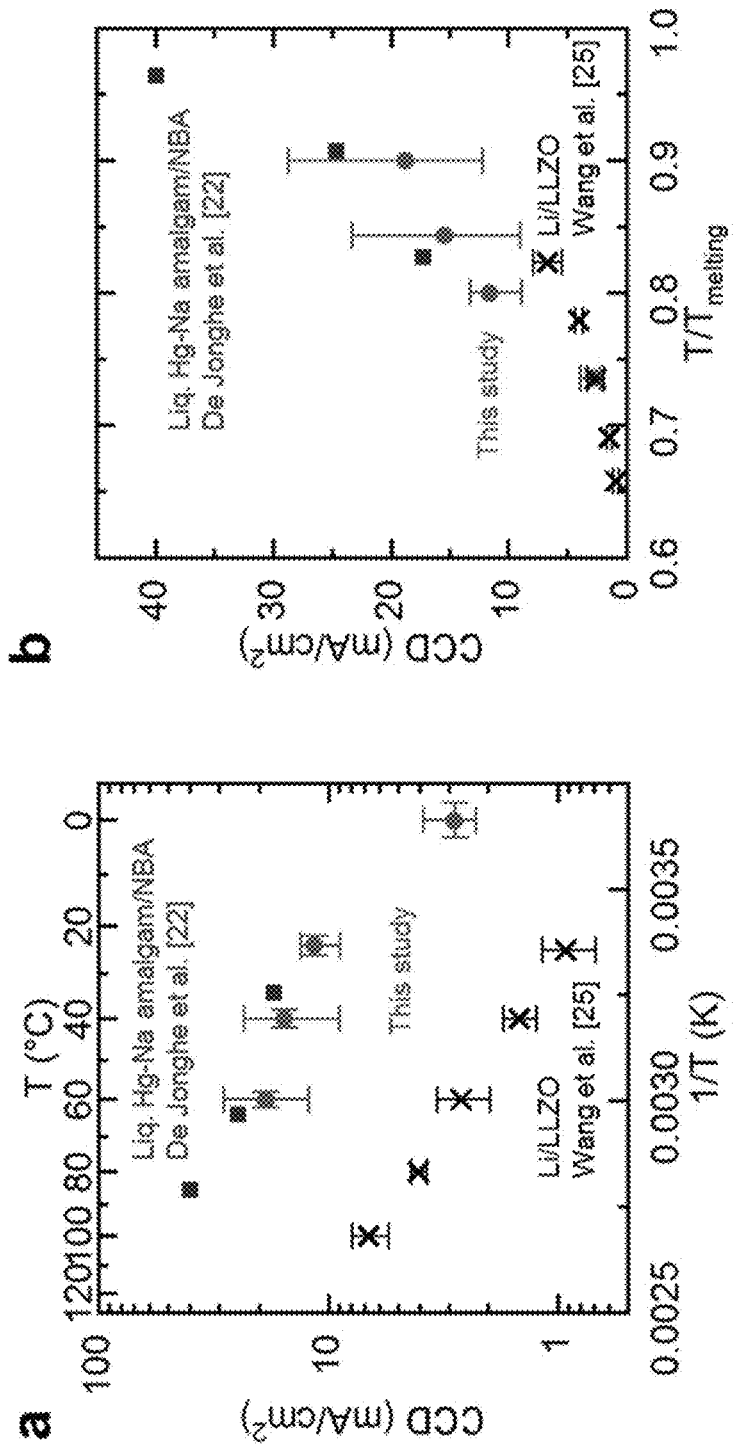
FIG. 7 shows temperature-dependent CCD and comparison with literature in (a), and in Arrhenius representation in (b) as a function of homologous temperature (T/T$_{melting}$) wherein [22] is L. C. De Jonghe, L. Feldman, A. Buechele, Failure modes of Na-beta alumina, *Solid State Ionics*, 5 (1981) 267-269, and [25] is M. Wang, J. B. Wolfenstine, J. Sakamoto, Temperature dependent flux balance of the Li/Li$_7$La$_3$Zr$_2$O$_{12}$ interface, *Electrochim. Acta.* 296 (2019) 842-847.

The effect of stripping/plating temperature on the CCD was investigated on samples heat-treated at 900° C. in a temperature range from 0 to 60° C. The results are plotted in (a) of FIG. 7 in Arrhenius representation. Similarly to literature, we find an exponential relationship between CCD and inverse temperature (taking into account the error bars) with activation energy of 0.27 eV. By increasing the temperature to 60° C., critical current densities up to 19 mA/cm² can be achieved, which is in agreement with acoustic measurements from the 1980s employing a liquid mercury sodium amalgam [Ref. 22]. While this temperature behavior is currently not completely understood, Han et al. recently proposed that dendrite formation is governed by the electronic conductivity of the electrolyte, governing the rate at which sodium ions are reduced to metallic sodium in the bulk of the solid electrolyte above the plating potential [Ref. 23]. They concluded that the electronic conductivity should be lower than $10^{-12}$ S/cm to enable dendrite-free plating at 10 mA/cm$^2$. Although this criterion corresponds roughly to the measured values at room temperature in this Example ($6\times10^{-11}$ S/cm, 12 mA/cm$^2$), the electronic conductivity at 60° C. deviates by three orders of magnitude ($2\times10^{-9}$ S/cm) from this threshold, whereas the critical current densities improves by 30%. Furthermore, it was also shown that Na-β"-alumina can sustain critical current densities up to 300 mA/cm$^2$ [Ref. 22] at 350° C. at an electronic conductivity of ~$10^{-8}$ S/cm [Ref. 24]. It is clear that the ionic conductivity and charge transfer kinetics are also improved at the same time, and therefore a theory only based on the electronic conductivity cannot fully explain the temperature-dependent CCD measurements. Some of us recently hypothesized that the properties of the alkali metal electrode may govern dendrite formation [Ref. 25]. It was reported that flux imbalances at the interface caused by differences between the metal self-diffusivity in the alkali metal and the ionic diffusivity in the electrolyte may create metal pile-up at the interface, which eventually acts a nucleation site for dendritic growth. To better understand the role of the electrode metal, we compare in (a) of FIG. 7 the results for LLZO obtained in a previous study [Ref. 25]. Note that identical measurement conditions were applied and similar interfacial resistances were obtained. Over the measured temperature range, the CCD values for Na-β"-alumina are systematically ten times higher than for LLZO. It is interesting to note that the error bars for Na-β"-alumina are also larger. On the one hand, this could be the result of the bimodal grain and pore size distribution of the Na-β"-alumina ceramics as recently described in detail in Ref. 26. In particular, pores at the interface may lead to an increase in local current density. On the other hand, this could be the result of an amplification effect of surface inhomogeneities at higher current densities, as also observed to a smaller extent for LLZO for increasing temperature. Due to the difference in melting temperatures (97.79° C. for Na, 180.5° C. for Li), the metals differ in viscosity at the same measurement temperature. To take this difference into account, we plotted in (b) of FIG. 7 the CCD values as a function of the homologous temperature, which is defined as the temperature (T) divided by the melting temperature ($T_{melting}$) of the alkali metal. The results in (b) of FIG. 7 show an exponential relationship for both systems, with a deviation in the behavior for homologous temperature >0.66 (corresponding to >0° C. for Na system, >60° C. for Li system). These differences may be explained by differences in the flux balance at the electrolyte/electrode interface: In the lithium system, the diffusivities of Li$^0$ in Li and Li$^+$ in LLZO differ by a factor ~100 ($5\times10^{-11}$ cm$^2$/s vs $2\times10^{-9}$ cm$^2$/s at room temperature, respectively). In comparison, the diffusivities of Na$^0$ in Na and Na$^+$ in Na-β"-alumina differ by a factor of only ~10 ($5\times10^{-9}$ vs $3\times10^{-8}$ cm$^2$/s at room temperature, respectively). Therefore, plated Na atoms move more easily into the bulk of the metal than Li atoms, enabling the use of higher current densities up to the point, when the flux of ions migrating from the electrolyte to the interface is higher than the flux of metal atoms moving away from the interface into the bulk. Furthermore, it is interesting to note that the self-diffusivity of sodium is about hundred times the self-diffusivity of lithium ($5\times10^{-9}$ cm$^2$/s vs. $5\times10^{-11}$ cm$^2$/s at room temperature, respectively). It is thus expected that higher stripping rates can be applied at a sodium metal anode until the point where vacancies supersaturate and start to form voids at the interface (assuming that the self-diffusivity is proportional to the vacancy diffusion). Similarly, the void filling process during plating is also expected to be faster for higher self-diffusivities, allowing replenishing the surface at higher current densities. However, modelling the situation at the interface would be beneficial to fully understand the mechanism of dendritic growth, taking into account mechanical properties of the alkali metal such as creep, elastic, and plastic properties.

CONCLUSION

Applying a heat treatment on finely polished Na-β"-alumina ceramics in argon atmosphere to eliminate surface hydroxyl groups, the interfacial resistance of symmetric Na/Na-β"-alumina cells was reduced from 100s of Ωcm$^2$ to 8 Ωcm$^2$ at room temperature. This improvement in interfacial resistance drastically increases the critical current density from 0.3 to 12 mA/cm$^2$ for a total transferred charge density of 0.25 mAh/cm$^2$ per half cycle. Increasing the charge density was demonstrated to increase the cell polarization, presumably due to the formation of voids at the interface between electrolyte and metal anode, highlighting the advantages of applying stack pressure. Compared to the garnet-type LLZO, the critical current densities obtained for Na-β"-alumina are ten times higher despite similar transference number. While the temperature-dependent critical current density measurements both show an exponential behavior with comparable activation energy, without intending to be bound by theory, we attribute the tenfold difference in CCD to the diffusive properties of the alkali metals and of the solid electrolyte.

Currently the development of all-solid-state batteries based on sodium metal anodes is hindered by the lack of availability of an appropriate sodium cathode material that can compete in performance, e.g., with nickel-rich layered oxides employed in lithium-ion batteries (e.g., NMC811). However, our results demonstrate that with use of such an appropriate sodium cathode material that can compete in performance, an all-solid-state sodium metal battery with fast charging capabilities based on a Na-β"-alumina electrolyte becomes a very promising option for rapid commercialization and market deployment.

Overall, it has been demonstrated that the combination of a fine polishing and a heat treatment temperature process in inert atmosphere allow one to obtain low interfacial resistance in contact with metallic Na and unprecedently high critical current densities. These results are promising for the development of fast-charge all-solid-state batteries.

Thus, Na-β"-alumina (NBA) ceramics are excellent candidates to be used as electrolyte for room-temperature solid-state batteries due to their high ion conductivity, low electronic conductivity, and stability against metallic sodium. One of the challenges associated with the fabrication of solid-state batteries, is the high solid-solid interfacial resistance between the metallic sodium and the ceramic electrolyte, which decreases the critical current densities. The present Example provides a surface treatment of NBA ceramics and a method for assembling symmetrical Na/NBA electrochemical devices enabling interfacial resistance <10 Ωcm$^2$ and current densities up to 12 mA/cm$^2$ at room temperature.

REFERENCES

[1] D. Lin, Y. Liu, Y. Cui, Reviving the lithium metal anode for high-energy batteries, Nat. Nanotechnol. 12 (2017) 194-206. doi:10.1038/nnano.2017.16.

[2] Y. Ren, Y. Shen, Y. Lin, C.-W. Nan, Direct observation of lithium dendrites inside garnet-type lithium-ion solid electrolyte, Electrochem. Commun. 57 (2015) 27-30. doi:10.1016/j.elecom.2015.05.001.

[3] E. J. Cheng, A. Sharafi, J. Sakamoto, Intergranular Li metal propagation through polycrystalline $Li_{6.25}Al_{0.25}La_3Zr_2O_{12}$ ceramic electrolyte, Electrochim. Acta. 223 (2017) 85-91. doi:10.1016/j.electacta.2016.12.018.

[4] L. Porz, T. Swamy, B. W. Sheldon, D. Rettenwander, T. Frömling, H. L. Thaman, S. Berendts, R. Uecker, W. C. Carter, Y.-M. Chiang, Mechanism of Lithium Metal Penetration through Inorganic Solid Electrolytes, Adv. Energy Mater. 7 (2017) 1701003. doi:10.1002/aenm.201701003.

[5] A. Gupta, E. Kazyak, N. Craig, J. Christensen, N. P. Dasgupta, J. Sakamoto, Evaluating the Effects of Temperature and Pressure on Li/PEO-LiTFSI Interfacial Stability and Kinetics, J. Electrochem. Soc. 165 (2018) A2801-A2806. doi:10.1149/2.0901811jes.

[6] A. Sharafi, E. Kazyak, A. L. Davis, S. Yu, T. Thompson, D. J. Siegel, N. P. Dasgupta, J. Sakamoto, Surface Chemistry Mechanism of Ultra-Low Interfacial Resistance in the Solid-State Electrolyte $Li_7La_3Zr_2O_{12}$, Chem. Mater. 29 (2017) 7961-7968. doi:10.1021/acs.chemmater.7b03002.

[7] R. Murugan, V. Thangadurai, W. Weppner, Fast Lithium Ion Conduction in Garnet-Type $Li_7La_3Zr_2O_{12}$, Angew. Chemie Int. Ed. 46 (2007) 7778-7781. doi:10.1002/anie.200701144.

[8] V. Thangadurai, S. Narayanan, D. Pinzaru, Garnet-type solid-state fast Li ion conductors for Li batteries: critical review, Chem. Soc. Rev. 43 (2014) 4714. doi:10.1039/c4cs00020j.

[9] C.-L. Tsai, V. Roddatis, C. V. Chandran, Q. Ma, S. Uhlenbruck, M. Bram, P. Heitjans, O. Guillon, $Li_7La_3Zr_2O_{12}$ Interface Modification for Li Dendrite Prevention, ACS Appl. Mater. Interfaces. 8 (2016) 10617-10626. doi:10.1021/acsami.6b00831.

[10] W. Luo, Y. Gong, Y. Zhu, Y. Li, Y. Yao, Y. Zhang, K. K. Fu, G. Pastel, C.-F. Lin, Y. Mo, E. D. Wachsman, L. Hu, Reducing Interfacial Resistance between Garnet-Structured Solid-State Electrolyte and Li-Metal Anode by a Germanium Layer, Adv. Mater. 29 (2017) 1606042. doi:10.1002/adma.201606042.

[11] T. Krauskopf, H. Hartmann, W. G. Zeier, J. Janek, Toward a Fundamental Understanding of the Lithium Metal Anode in Solid-State Batteries—An Electrochemo-Mechanical Study on the Garnet-Type Solid Electrolyte $Li_{6.25}Al_{0.25}La_3Zr_2O_{12}$, ACS Appl. Mater. Interfaces. 11 (2019) 14463-14477. doi:10.1021/acsami.9b02537.

[12] M. J. Wang, R. Choudhury, J. Sakamoto, Characterizing the Li-Solid-Electrolyte Interface Dynamics as a Function of Stack Pressure and Current Density, Joule. (2019) 1-14. doi:10.1016/j.joule.2019.06.017.

[13] P. Albertus, S. Babinec, S. Litzelman, A. Newman, Status and challenges in enabling the lithium metal electrode for high-energy and low-cost rechargeable batteries, Nat. Energy. 3 (2018) 16-21. doi:10.1038/s41560-017-0047-2.

[14] C.-H. Dustmann, Advances in ZEBRA batteries, J. Power Sources. 127 (2004) 85-92. doi:10.1016/j.jpowsour.2003.09.039.

[15] J. L. Sudworth, The sodium/nickel chloride (ZEBRA) battery, J. Power Sources. 100 (2001) 149-163. doi:10.1016/S0378-7753(01)00891-6.

[16] J. L. Sudworth, The sodium/sulphur battery, J. Power Sources. 11 (1984) 143-154. doi:10.1016/0378-7753(84)80080-4.

[17] M.-C. Bay, M. V. F. Heinz, R. Figi, C. Schreiner, D. Basso, N. Zanon, U. F. Vogt, C. Battaglia, Impact of Liquid Phase Formation on Microstructure and Conductivity of Li-Stabilized Na-β"-alumina Ceramics, ACS Appl. Energy Mater. 2 (2019) 687-693. doi:10.1021/acsaem.8b01715.

[18] S. Wenzel, T. Leichtweiss, D. A. Weber, J. Sann, W. G. Zeier, J. Janek, Interfacial Reactivity Benchmarking of the Sodium Ion Conductors $Na_3PS_4$ and Sodium β-Alumina for Protected Sodium Metal Anodes and Sodium All-Solid-State Batteries, ACS Appl. Mater. Interfaces. 8 (2016) 28216-28224. doi:10.1021/acsami.6b10119.

[19] A. Sharafi, H. M. Meyer, J. Nanda, J. Wolfenstine, J. Sakamoto, Characterizing the $Li-Li_7La_3Zr_2O_{12}$ interface stability and kinetics as a function of temperature and current density, J. Power Sources. 302 (2016) 135-139. doi:10.1016/j.jpowsour.2015.10.053.

[20] L. Viswanathan, A. V. Virkar, Wetting characteristics of sodium on β"-alumina and on nasicon, J. Mater. Sci. 17 (1982) 753-759. doi:10.1007/BF00540372.

[21] G. T. Hitz, D. W. McOwen, L. Zhang, Z. Ma, Z. Fu, Y. Wen, Y. Gong, J. Dai, T. R. Hamann, L. Hu, E. D. Wachsman, High-rate lithium cycling in a scalable trilayer Li-garnet-electrolyte architecture, Mater. Today. 22 (2019) 50-57. doi:10.1016/j.mattod.2018.04.004.

[22] L. C. De Jonghe, L. Feldman, A. Buechele, Failure modes of Na-beta alumina, Solid State Ionics. 5 (1981) 267-269. doi:10.1016/0167-2738(81)90244-7.

[23] F. Han, A. S. Westover, J. Yue, X. Fan, F. Wang, M. Chi, D. N. Leonard, N.J. Dudney, H. Wang, C. Wang, High electronic conductivity as the origin of lithium dendrite formation within solid electrolytes, Nat. Energy. (2019). doi:10.1038/s41560-018-0312-z.

[24] M. Fritz, M. Barbosa, G. Staikov, W. Lorenz, M. Steinbruck, R. Knodler, Electronic conductivity of Na β"-alumina ceramics at high temperatures, Solid State Ionics. 62 (1993) 273-277. doi:10.1016/0167-2738(93)90382-D.

[25] M. Wang, J. B. Wolfenstine, J. Sakamoto, Temperature dependent flux balance of the $Li/Li_7La_3Zr_2O_{12}$ interface, Electrochim. Acta. 296 (2019) 842-847. doi:10.1016/j.electacta.2018.11.034.

[26] M.-C. Bay, M. V. F. Heinz, R. Figi, C. Schreiner, D. Basso, N. Zanon, U. F. Vogt, C. Battaglia, Impact of Liquid Phase Formation on Microstructure and Conductivity of Li-Stabilized Na-β"-alumina Ceramics, (2018). doi:10.1021/acsaem.8b01715.

The citation of any document is not to be construed as an admission that it is prior art with respect to the present invention.

Thus, the invention provides methods for lowering the interfacial resistance between an electrode and a solid state electrolyte and for raising the critical current density for solid-state batteries.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. Various features and advantages of the invention are set forth in the following claims.

What is claimed is:

1. A method for forming an electrochemical device, the method comprising:
   (a) providing a sintered body having a resistive surface region, wherein the sintered body comprises metal cation-alumina;
   (b) removing at least a portion of the resistive surface region using an abrasive material;
   (c) thereafter heating the sintered body thereby forming a solid state electrolyte; and
   (d) thereafter placing a side of the solid state electrolyte in contact with an electrode to form a electrochemical device.

2. The method of claim 1 wherein:
the metal cation-alumina is sodium-$\beta$"-alumina, and
the sintered body further comprises a stabilizer for the sodium-$\beta$"-alumina.

3. The method of claim 2 wherein:
the stabilizer is selected from the group consisting of $Li_2O$, MgO, NiO, CoO, ZnO, and mixtures thereof.

4. The method of claim 3 wherein:
step (a) comprises combining a first solid comprising aluminum, a second solid comprising sodium, and a third solid comprising lithium to form a mixture, and sintering the mixture to form the sintered body.

5. The method of claim 1 wherein:
step (b) comprises removing the portion of the resistive surface region with abrasive particles.

6. The method of claim 1 wherein:
step (c) comprises heating the sintered body at a temperature in a range of 400° C. to 1600° C.

7. The method of claim 6 wherein:
step (c) comprises heating the sintered body at the temperature for 0.1 seconds to 5 hours.

8. The method of claim 6 wherein:
step (c) comprises heating the sintered body in an inert atmosphere.

9. The method of claim 1 wherein:
step (d) further comprises pressing the solid state electrolyte and the electrode together using a pressure in a range of 0.01 MPa to 10 MPa.

10. The method of claim 9 wherein:
the electrode comprises sodium metal, and
the metal cation-alumina is sodium-$\beta$"-alumina.

11. The method of claim 1 wherein:
an area-specific resistance between the electrode and the solid state electrolyte is less than 100 ohm $cm^2$.

12. The method of claim 1 further comprising:
(e) placing an opposite side of the solid state electrolyte in contact with a second electrode to form an electrochemical cell.

13. The method of claim 12 wherein:
a critical current density of the electrochemical cell at room temperature is greater than 2 $mA/cm^2$.

14. The method of claim 12 wherein:
the electrode is an anode consisting essentially of a metal selected from the group consisting of sodium, lithium, potassium, calcium, magnesium, zinc, nickel, aluminum, barium, and strontium.

15. The method of claim 14 wherein:
the metal is sodium.

16. The method of claim 14 wherein:
the second electrode is a cathode comprising an active material selected from the group consisting of layered metal oxides, metal halides, polyanionic compounds, porous carbon, and sulfur containing materials.

17. The method of claim 12 wherein:
the electrode is an anode comprising a cation host material.

18. The method of claim 12 wherein:
the electrode is an anode comprising a sodium host material, and
the sodium host material is selected from the group consisting of (i) sodium-doped silicon, germanium, tin, lead, antimony, bismuth, zinc, aluminum, titanium, cobalt, nickel, manganese, cadmium, and mixtures thereof, (ii) sodium-containing alloys of silicon, germanium, tin, lead, antimony, bismuth, zinc, aluminum, titanium, cobalt, nickel, manganese, cadmium, and mixtures thereof; (iii) sodium-containing oxides, carbides, nitrides, sulfides, phosphides, selenides, tellurides and mixtures thereof; and (iv) carbon.

19. The method of claim 18 wherein:
the second electrode is a cathode comprising an active material selected from the group consisting of layered metal oxides, metal halides, polyanionic compounds, porous carbon, and sulfur containing materials.

* * * * *

UNITED STATES PATENT AND TRADEMARK OFFICE
CERTIFICATE OF CORRECTION

PATENT NO. : 11,515,564 B2
APPLICATION NO. : 16/560229
DATED : November 29, 2022
INVENTOR(S) : Marie-Claude Bay et al.

It is certified that error appears in the above-identified patent and that said Letters Patent is hereby corrected as shown below:

In the Specification

Column 7, Line 6, "dilithiation" should be --delithiation--.

Column 11, Line 54, "(Fs$^{\alpha-1}$)" should be --(Fs$^{a-1}$)--.

Signed and Sealed this
Twenty-eighth Day of February, 2023

Katherine Kelly Vidal
*Director of the United States Patent and Trademark Office*